United States Patent [19]

Ungvari et al.

[11] 4,305,602
[45] Dec. 15, 1981

[54] UTILITY TRAILER

[76] Inventors: Aloysius Ungvari, 9216 Nathaline St., Redford Township, Wayne County, Mich. 48239; Frank N. Rubino, 8701 August, Westland, Mich. 48185

[21] Appl. No.: 134,213

[22] Filed: Mar. 26, 1980

[51] Int. Cl.³ .......................... B60D 1/06; B62D 63/06
[52] U.S. Cl. ............................ 280/460 R; 280/414 R;
    280/656; 280/789
[58] Field of Search ............... 280/699, 718, 719, 694,
    280/47.23, 2, 63, 65, 80 R, 789, 720, 460 R, 401,
    414 R, 656; 296/76, 35.1, 35.3; 224/42.03 A,
    42.05; 267/19A

[56] References Cited

U.S. PATENT DOCUMENTS

| | | | |
|---|---|---|---|
| 2,198,270 | 4/1940 | Maranville | 280/460 R |
| 3,179,439 | 4/1965 | Janeway | 267/19 A X |
| 3,202,332 | 8/1965 | Walker | 224/42.03 A |
| 3,387,853 | 6/1968 | Sueoka | 280/789 |
| 3,784,230 | 1/1974 | Worrall | 280/789 |
| 4,076,264 | 2/1978 | Chatterley | 280/460 R |
| 4,239,253 | 12/1980 | Golze | 280/460 R |

FOREIGN PATENT DOCUMENTS

| | | | |
|---|---|---|---|
| 114320 | 6/1941 | Australia | 280/460 R |
| 234272 | 9/1944 | Switzerland | 280/460 R |

Primary Examiner—Joseph F. Peters, Jr.
Assistant Examiner—Randall A. Schrecengost
Attorney, Agent, or Firm—Robert G. Mentag

[57] ABSTRACT

A lightweight utility trailer with a lockable enclosure to provide additional carrying space for vehicles having small trunk areas. The utility trailer is closely connected to a towing vehicle by two pivoted, laterally spaced apart attachment members. Two pivoted wheel assemblies allow the utility trailer to follow a towing vehicle's rear end movements, so as to facilitate the parking and the overall operation of the trailer. A unique frame and suspension provides a low mounting for the center part of the trailer body. The trailer body is attached to the frame by slides to allow the trailer body to be in a closely coupled relationship with a towing vehicle during a towing operation, and yet permit the trailer body to be moved apart from the towing vehicle to allow easy access to the vehicle trunk. A low, lift-over, cut-out is provided in the rear of the trailer body to allow easy placing of objects in the trailer body, and removal of the same.

5 Claims, 12 Drawing Figures

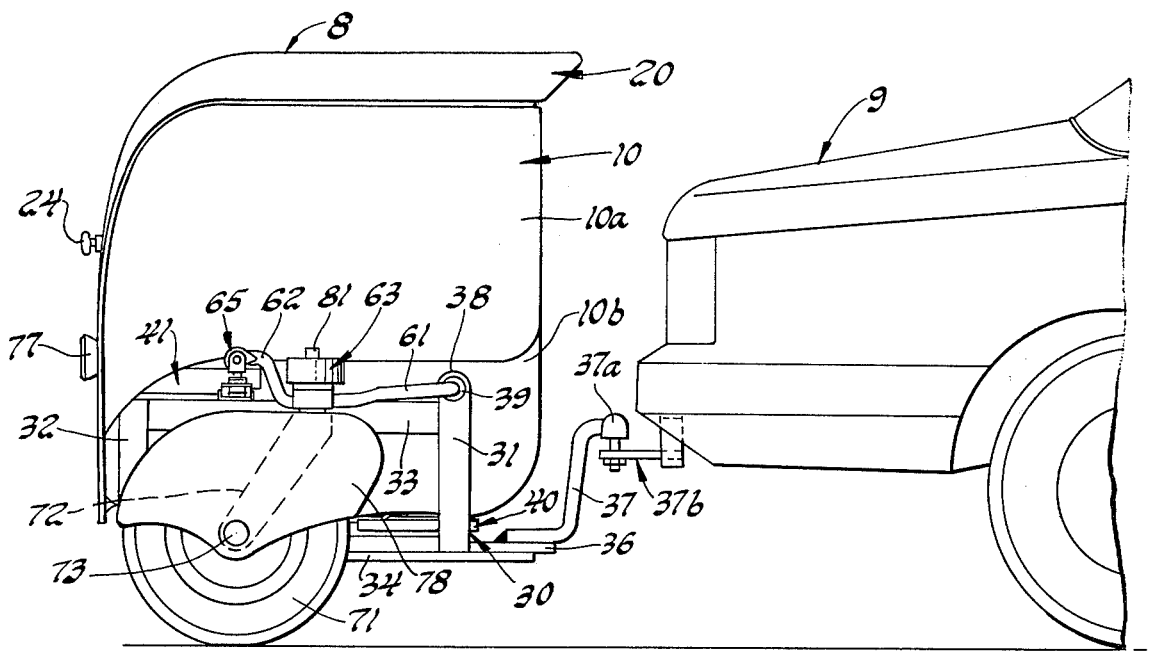
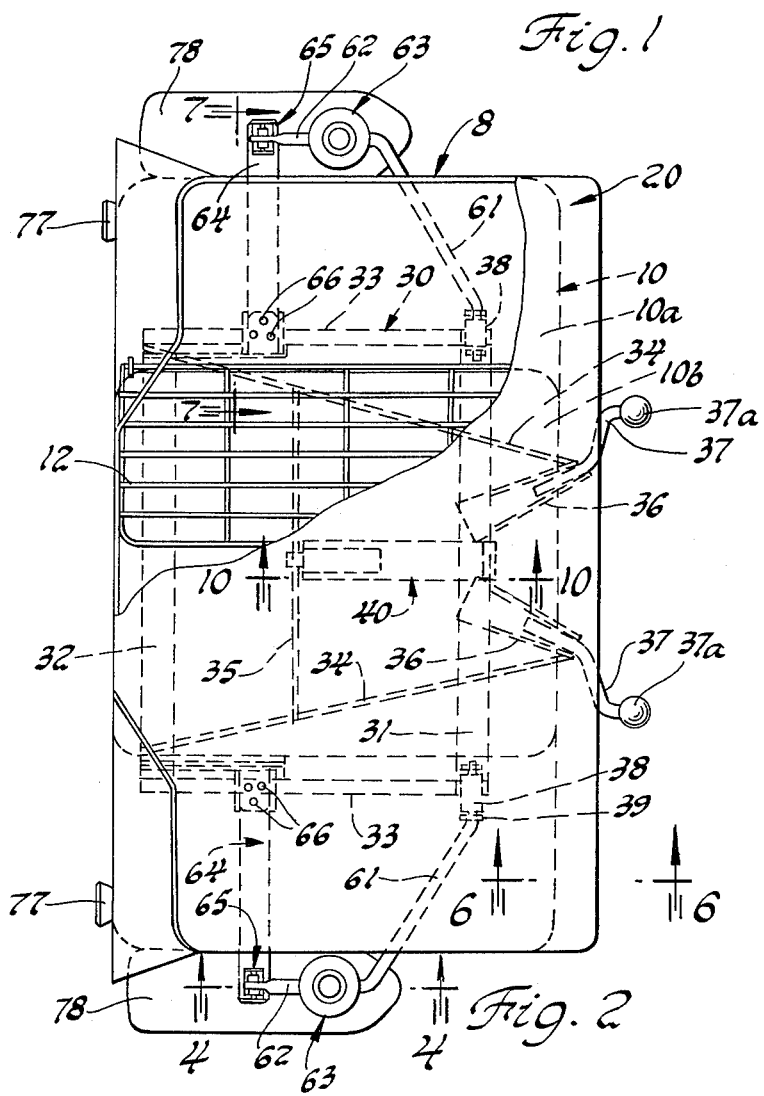
Fig. 1
Fig. 2

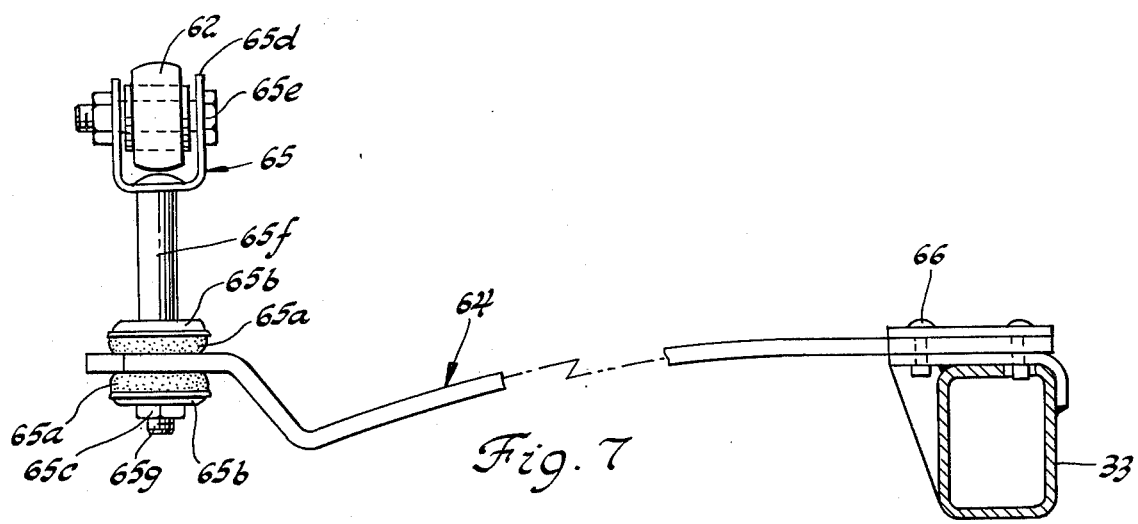
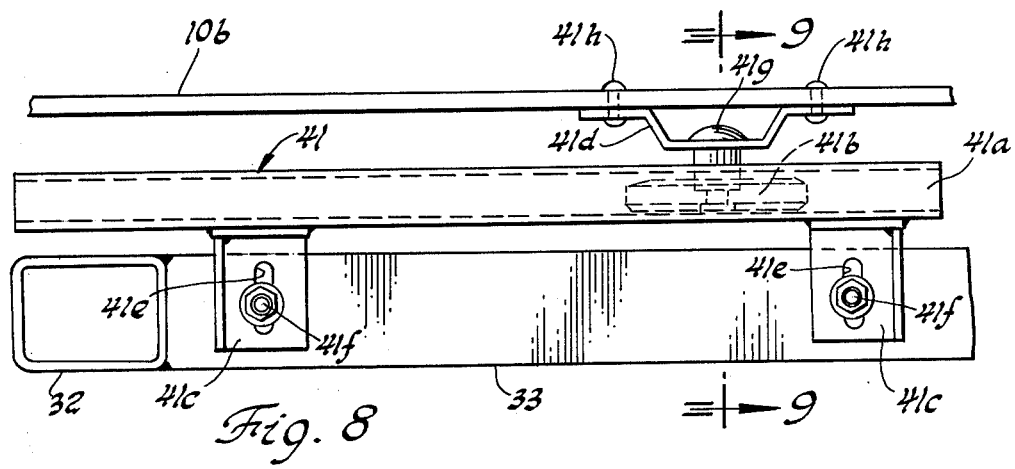
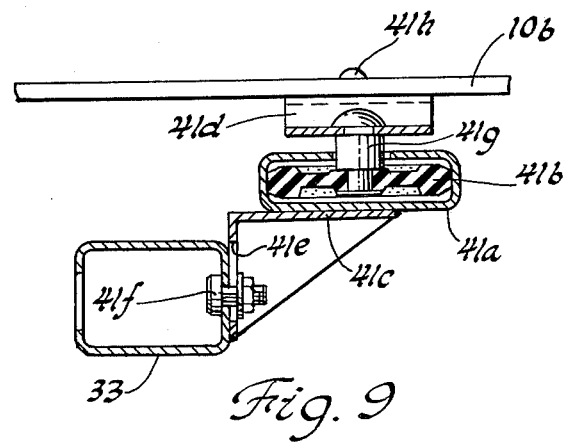

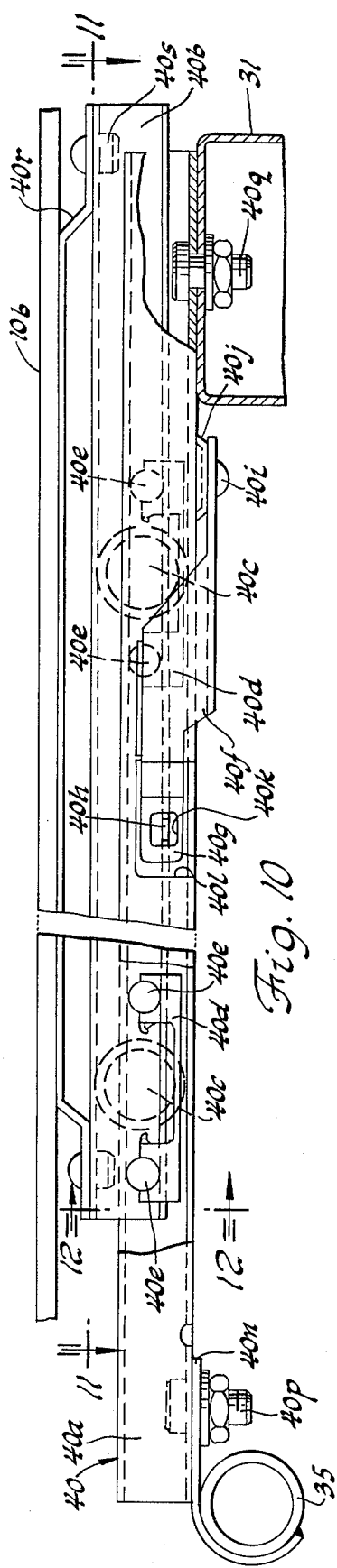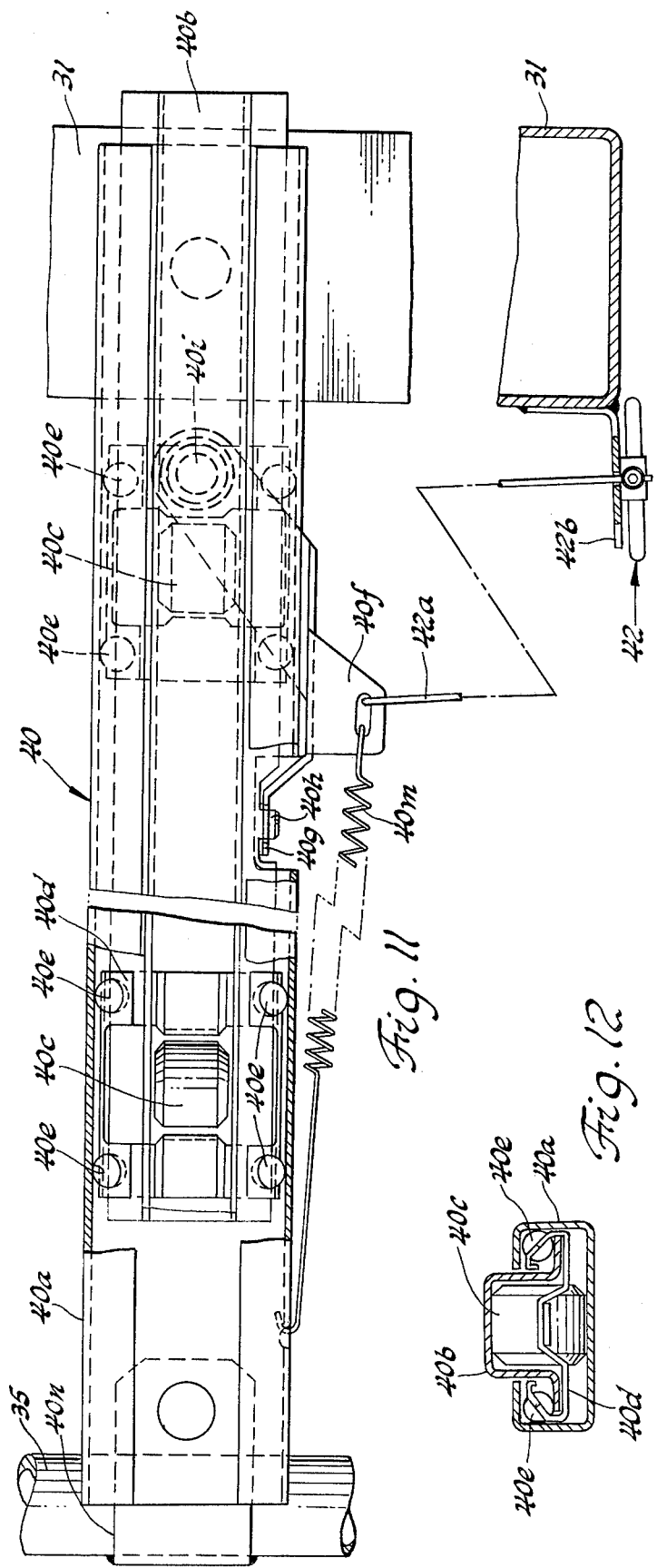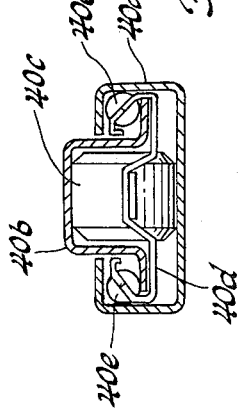

UTILITY TRAILER

BACKGROUND OF THE INVENTION

1. Field of the Invention

This invention relates to the trailer art, and more particularly, to a novel and improved utility trailer. The invention is specifically concerned with a lightweight utility trailer which is particularly adapted for use with vehicles that have small trunk areas, such as compact cars, sports cars, and the like.

2. Description of the Prior Art

It is well known in the trailer art to provide utility trailers for attachment to small size vehicles for hauling articles from one place to another. A disadvantage of the prior art utility trailers is that they are not constructed and arranged to have the trailer body closely adjacent to a towing vehicle. Another disadvantage of the prior art utility trailers is that the body of such trailers is disposed at a high level relative to the towing vehicle so as to obstruct the vision of the driver of a towing vehicle. Another disadvantage of the prior art utility trailers is that they are attached to a towing trailer with a towing hitch means that make it difficult to park and otherwise maneuver the trailer. Examples of such prior art utility trailers are illustrated in U.S. Pat. Nos. 1,739,716; 3,257,125; 3,784,230 and 3,917,316.

SUMMARY OF THE INVENTION

This invention relates to improvements in utility trailers which are towed by motor vehicles, and in particular to utility trailers which adapted for use with vehicles having small trunk areas, such as compact cars, sports cars and the like. The utility trailer of the present invention provides additional lockable and secure storage space for compact cars and sports cars, and it can be used by any driver without the aggravation caused by the handling and parking of conventional utility trailers. The utility trailer of the present invention is adapted for a closely attached relationship to a towing vehicle, which results in a combined vehicle-trailer overall length that fits in a normal parking space.

The utility trailer of the present invention has two laterally spaced, independent, swivelly mounted side support wheels which provide the utility trailer with inherent stability. The utility trailer of the present invention is provided with a body which has a low, deep center section, and raised side sections to allow for full circular pivoting of both side support wheels, and which has a minimum overall height so as to provide an unobstructed rear view from a towing vehicle. The utility trailer body is carried by a unique frame and suspension means which includes two transversely positioned quarter-elliptic type spring arms, and two trailer arms. The swivelly mounted side support wheels and suspension means maintains all parts of the support wheels forward of the rearmost part of the trailer to minimize the overall length of the vehicle-trailer combination.

The utility trailer body is provided with sliding means for relocating the trailer body in a rearward position, spaced apart from the rear end of the towing vehicle, to provide quick and easy access to the trunk of the towing vehicle. The sliding means allows the trailer body to be moved forwardly to the normal towing position after the trunk of the towing vehicle is closed so as to shorten the overall vehicle-trailer length. The body of the utility trailer is provided with a low liftover cut-out in the rear end thereof to provide access into the trailer body for the purpose of placing objects within the body or removing them with a minimum of effort and ease, so that elderly persons are capable of using the utility trailer. The trailer body is provided with a top cover that is lockable and which maintains the trailer body weatherproof when the top cover is in a closed position. The trailer body top cover is provided with detachable hinges for quick and easy removal of the top cover when it is desired to carry exceptionally tall articles.

The utility trailer is readily engaged with a vehicle or disengaged therefrom by the use of two laterally spaced ball-socket type attachments which are adapted to be used with conventional hitch type bracketry, or to some other means, thus assuring united trailer and vehicle rear-end lateral motions. This feature enables the trailer to be used in the conventional way of parking in reverse or traveling in reverse.

The aforementioned trailer structure permits use of the utility trailer with relative ease and convenience for everyday grocery shopping, carrying of small items and appliances, such as golf bags and golf carts, various sport equipments, lawn care equipments, and for luggage hauling during long distance travel.

Other features and advantages of this invention will be apparent from the following detailed description, appended claims and the accompanying drawings.

BRIEF DESCRIPTION OF THE DRAWINGS

FIG. 1 is a side elevation of a utility trailer made in accordance with the principles of the present invention, and showing the trailer attached to a towing vehicle.

FIG. 2 is a top plan view of the utility trailer illustrated in FIG. 1, with parts broken away and parts in section.

FIG. 7 is an enlarged, broken, rear end elevational view of the left spring support structure, taken substantially along the line 7—7 of FIG. 2, and looking in the direction of the arrows.

FIG. 8 is an enlarged, top plan view of the left side slide assembly, taken substantially along the line 8—8 of FIG. 3, and looking in the direction of the arrows.

FIG. 9 is a fragmentary, enlarged, vertical section view of the right side slide assembly, taken substantially along the line 9—9 of FIG. 8, and looking in the direction of the arrows.

FIG. 10 is an enlarged, side elevational view of the lower slide assembly, with parts broken away and parts in section, taken substantially along the line 10—10 of FIG. 2, and looking in the direction of the arrows.

FIG. 11 is an enlarged top plan view of the lower slide assembly, with parts broken away and parts in section, taken substantially along the line 11—11 of FIG. 10, and looking in the direction of the arrows and showing the slider latch and cable assembly.

FIG. 12 is an enlarged, vertical section view of the lower slide assembly, taken substantially along the line 12—12 of FIG. 10, and looking in the direction of the arrows.

DESCRIPTION OF THE PREFERRED EMBODIMENT

Figure 3:
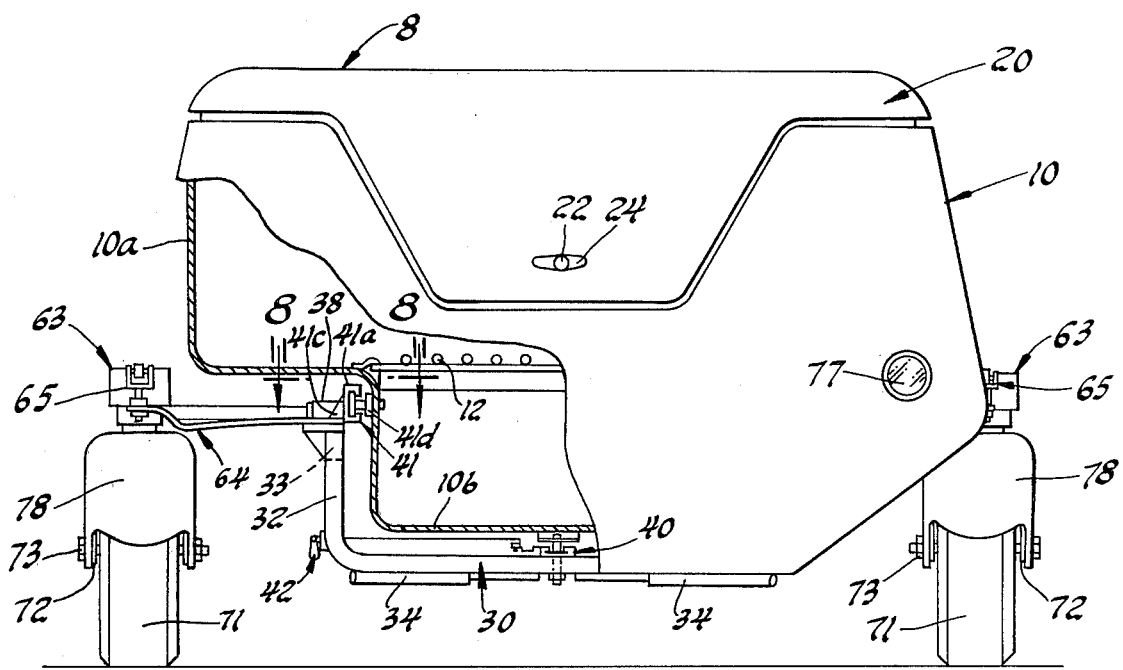
FIG. 3 is a rear end elevation view of the utility trailer illustrated in FIG. 1, with parts broken away and parts in section.

Referring now to the drawings, and in particular, to FIGS. 1 and 2, the numeral 8 generally designates a utility trailer made in accordance with the principles of the present invention. The trailer 8 is adapted to be releasably attached to a towing vehicle, generally designated by the numeral 9, the rear end of which is shown fragmentarily. The utility trailer 8 includes a trailer body, generally designated by the numeral 10, which is provided with a lockable top cover, generally indicated by the numeral 20. The trailer body 10 is slidably mounted on a support frame assembly which is generally indicated by the numeral 30.

The support frame assembly 30 comprises a pair of longitudinally spaced apart, front and rear transverse U-shaped members 31 and 32, respectively, which may be made from any suitable material, as from a rectangular, tubular steel material. As shown in FIG. 3, the trailer body 10 includes an upper portion 10a, and a lower portion 10b which is smaller in cross section and which is adapted to be disposed within the U-shaped frame members 31 and 32. As shown in FIG. 3, the support frame assembly 30 further includes a pair of longitudinally disposed frame side members 33, which are made of the same material as the transverse front and rear members 31 and 32. The longitudinal frame side members 33 are fixedly secured between the upper ends of the transverse frame members 31 and 32, by any suitable means, as by welding. The support frame assembly 30 further includes a pair of tubular bars 34 which are secured to the transverse frame members 31 and 32, and which are disposed so as to converge in a forward direction. The tubular bars 34 extend from the outer edges of the rear members 32, and they are secured to the front frame member 31 at positions on the opposite side of the longitudinal center line of the frame. The tubular bars 34 are secured to the transverse frame bars 31 and 32 by any suitable means, as by welding. As shown in FIG. 2, a frame cross bar 35 is transversely disposed with its ends fixedly secured to the tubular bars 34, by any suitable means, as by welding. The cross bar 35 provides additional rigidity and support for the lower slide assembly structure indicated by the numeral 40.

As shown in FIGS. 1 and 2, two adapter plates 36 are secured to the front frame member 31, by any suitable means, as by welding. The adapter plates 36 are formed at their sides so as to have flanges up to the front face of the frame member 31 and an extended portion without flanges under the frame member 31. As shown in FIG. 2, the adapter plates 36 are disposed on opposite sides of the lower slide assembly structure 40, and they extend forwardly in a diverging manner. A Z-shaped round bar member 37 is fixedly connected to each of the adapter plates 36. The lower ends of each of the Z-shaped members 37 are fixed to their respective adapter plate 36 by any suitable means, as by welding.

As illustrated in FIG. 1, each of the Z-shaped bar members 37 is fixedly connected, as by welding, to a conventional ball head attachment member 37a which is adapted to be operatively mounted on a conventional hitch ball carried on a conventional trailer hitch means, generally indicated by the numeral 37b. It will be understood from FIGS. 1 and 2 that the last described hitch arrangement means provides a pair of hitch structures which are laterally spaced apart and connected to the forward part of the trailer frame so as to ensure a united trailer and vehicle rear-end lateral motion.

The trailer body 10 is slidably attached to the support frame assembly 30 by a centrally disposed, lower slide assembly, generally indicated by the numeral 40 (FIGS. 2, 3, 10 and 11), and two side slide assemblies, generally indicated by the numeral 41. The left side slide assembly 41 is shown in FIG. 3, and it will be understood that the right side of the body 10 is slidably supported by a similar side slide assembly 41. As illustrated in FIG. 8, each of the side slide assemblies 41 comprises a vertically disposed, C-shaped, elongated channel member 41a which is fixedly secured by a pair of suitable bracket means 41c to the upper side of the longitudinal frame members 33. The pair of bracket means 41c are fixed to the C-shaped member 41a by any suitable means, as by welding. Each of the bracket means 41c are adjustably attached to the longitudinal frame member 33 by a slot 41e in the bracket means 41c and a suitable bolt and nut means 41f. Each of the side slide assemblies 41 also includes a roller member 41b which is movably mounted in the adjacent channel member 41a. The roller member 41b is rotatably mounted on a suitable shaft 41g which is operatively carried on a bracket 41c that is fixedly secured to the side wall of the body lower portion 10b by suitable rivets 41h, or the like.

The lower slide assembly generally referred to by the numeral 40, is shown in more detail in FIGS. 10 and 11, and it comprises a horizontally disposed, C-shaped, elongated lower channel member 40a. The lower slide assembly further comprises an inverted U-shaped, elongated slider upper channel member 40b, with flanges on both sides, and it is inserted in the C-shaped member 40a, as shown in FIG. 12. Two support rollers 40c are rollably positioned between the channel members 40a and 40b, and they are each mounted in a guide assembly consisting of a guide cage 40d and four ball shaped bearings 40e. Each guide assembly encases a support roller 40c and provides smooth sliding motion of the assembly.

A latch member 40f (FIGS. 10 and 11) is pivotally mounted to the lower channel member 40a by a suitable pivot pin 40i and pivot pin support bracket 40j. The latch member 40f has a specially shaped end 40g with a rectangular opening 40k that readily engages the specially formed tooth 40h on the flange of the upper slide member 40b, through recess 40l provided on channel member 40a. A spring 40m is so positioned between the channel member 40a and the latch member 40f (FIG. 11) so as to provide a positive engagement between the specially shaped latch member end 40g and the slider member flange tooth 40h. The slide assembly 40 is fixedly secured by suitable bracket means 40n and bolt means 40p to the frame cross bar 35. It also is secured to the front transverse frame member 31 by a bolt means 40q. The slider member 40b of the slide assembly is fixedly secured to a suitable bracket means 40r by bolt means 40s. The bracket means 40r is suitably secured to the lower center part of the lowered body section 10b. A cable operated latch 42 locks the lower slide assembly 40 in a forward position for travel purposes. A cable 42a has one end attached to the latch member 40f and the other end extended through a hole in an L-shaped bracket 42b and secured to a latch handle 42c. The bracket 42b is fixed, as by welding, to the U-shaped frame member 31. The latch 42 is shown as being on the right side of the utility trailer in FIG. 11. However, the latch 42, and the latch member 40f, the teeth 40h, and the other cooperating structure could be disposed as shown in FIG. 3 to put the latch 42 on the left side of the utility trailer.

As best seen in FIG. 2, the utility trailer of the present invention includes a suspension means on each side of the trailer body which includes a front trailing arm 61 that has the front end pivotally mounted in a suitable resilient bushing 39 that is carried in a sleeve 38, which in turn, is fixedly secured, as by welding, to the top end of one of the frame members 31. The bushings 39 are pressed into the sleeves 38. A swivel support assembly, generally indicated by the numeral 63, is fixedly secured to the rear ends of each of the trailing arms 61 (FIG. 4), by suitable means, as by welding.

Figure 4:
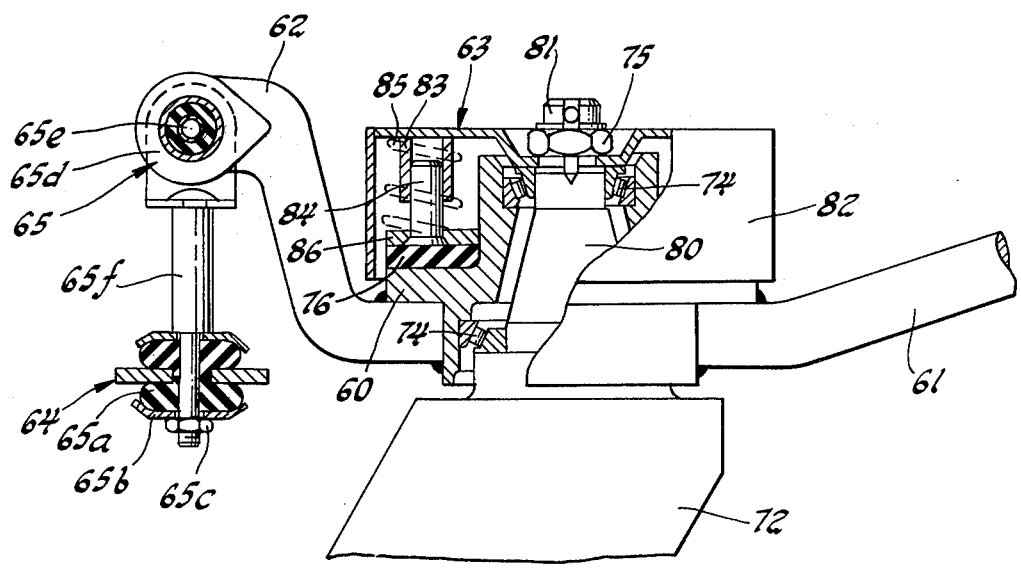
FIG. 4 is a fragmentary, enlarged, elevational section view of the right wheel pivot support structure and spring end attachment, taken substantially along the line 4—4 of FIG. 2, and looking in the direction of the arrows.

As best seen in FIG. 2, a rear trailing arm 62 is disposed on each side of the trailer, and the front ends thereof are fixedly secured to the adjacent swivel support assembly 63, by any suitable means, as by welding. The rear end of each of the trailing arms 62 is pivotally connected to the upper U-shaped end of a link arm, generally indicated by the numeral 65. As shown in FIGS. 4 and 7, each of the link arms 65 includes a U-shaped attachment member 65d which is pivotally attached to the trailing arm 62 by a suitable pivot bolt and nut means 65e. The link arms 65 also include a downwardly extended shaft 65f which is attached at its lower end by suitable resilient bushings 65a, retainer washers 65b, and fastener nuts 65c, to the outer end of a transverse spring assembly, generally indicated by the numeral 64. Each of the spring assemblies 64 comprise one or more quarter-elliptic springs. As shown in FIGS. 2 and 7, the inner end of each spring assembly 64 is fixedly secured to the top of the adjacent longitudinal frame side member 33, by any suitable means, as by suitable rivets 66.

As best seen in FIG. 3, the utility trailer of the present invention is provided with two laterally spaced apart support wheels 71 which are each carried on a support swivel 63 that is freely rotatable about a vertical axis. Each of the support wheels 71 is operatively connected to an adjacent support swivel 63 by the following described structure. As shown in FIG. 1, a fork arm 72 has its lower bifurcated end disposed over the right side support wheel 71, and it is attached to the last mentioned support wheel 71 by a suitable shaft means 73. As shown in FIG. 4, the upper end of each of the fork arms 72 has a reduced diameter and tapered end 80 which is rotatably supported in the adjacent pivoting hub 60 by a pair of suitable, vertically spaced apart swivel bearings 74.

As shown in FIG. 4, the upper end 81 of the fork arm reduced diameter portion 80 is threaded, and it extends through a suitable aperture in the upper horizontal end wall of a cylindrical cap member 82. The cap member 82 is secured against the inner race of the upper bearing member 74 by a suitable lock nut 75. The cap member 82 carries a plurality of sleeve members 83, which are fixed, as by welding, to the inner face of the horizontal end wall of the cap member 82. The sleeve members 83 are each slidably mounted over a suitable guide pin 84 which is fixed to a ring member 86. A frictional member 76 is fixed to the ring member 86 and slides on the flat surface part of pivoting hub 60. A suitable coil spring 85 is mounted around each of the sleeve members 83 and the guide pins 84. The last described structure functions with the cap member 82 to provide a spring loaded friction plate dampening means to eliminate unwanted oscillations of the wheel assemblies during travel of the utility trailer. As shown in FIGS. 1, 2 and 3, suitable wheel skirts 78 are positioned over each of the support wheels 71, and they are attached to the adjacent fork arm 72 by any suitable means, as by welding.

The utility trailer 10 is provided with a pair of suitable signal and rear lights 77 which are also capable of accepting a license plate attached to the rear face of the trailer body 10. The signal and rear lights 77 are each powered through conventional wiring from the towing vehicle 9.

Figure 6:
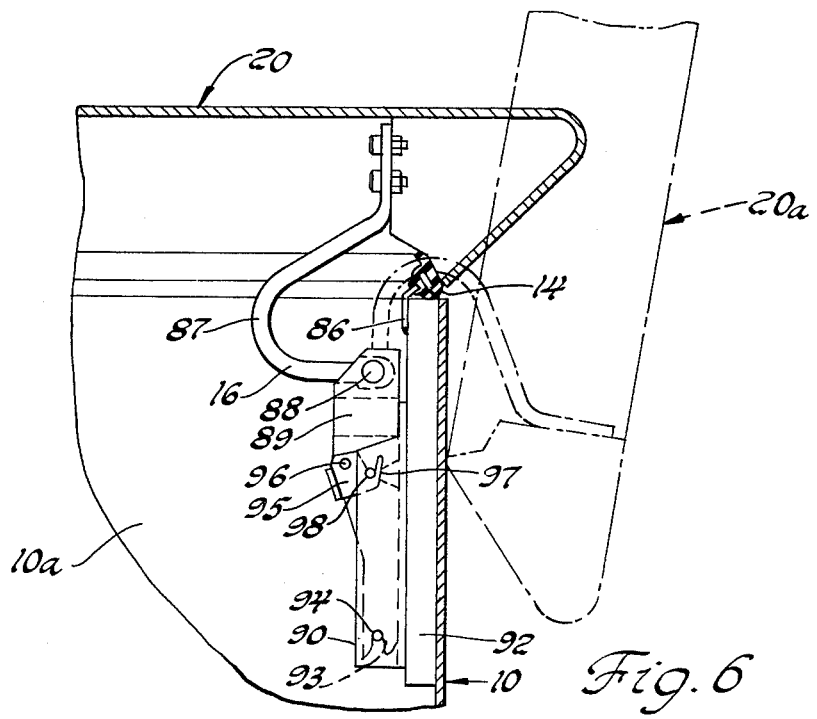
FIG. 6 is a fragmentary, enlarged, vertical section view through the utility trailer door and cover, taken substantially along the line 6—6 of FIG. 2, looking in the direction of the arrows, and showing one of the body cover hinges.

The trailer body 10 and the lid 20 are constructed and arranged to provide a lightweight, spacious, easily accessible, weather tight, and lockable enclosure. The trailer body 10 and lid 20 may be made from any suitable material as, for example, from fiberglass or molded plastic. The center section of the body 10 is lowered, as indicated by the numeral 10b, to provide for receiving tall objects. The side sections are raised, as shown in FIG. 3, to clear the side support wheels 71. Two foldable grates 12 may be closed over the center section to provide a wide flat surface space for large objects, such as suitcases, golf bags, etc., for disposition in the upper portion 10a of the body 10. The rear wall of the body 10 has a deeply cut opening, as shown in FIG. 3, which provides a low lift-over cut-out to facilitate entry and removal of objects. As shown in FIG. 6, a resilient seal 14 is placed between the edges of the body 10 and the lid 20 to provide weather tight enclosure when the lid 20 is in the closed position. The lid 20 is attached to the body 10 by the use of two hinges 16. The hinges 16 are designed for easy detachment from the body 10. This feature permits the easy removal of the lid 20 when exceptionally tall objects are to carried in the utility trailer. As shown in FIG. 3, a conventional type handle 24 provides easy opening and closing of the lid 20. The handle assembly 24 is provided with a conventional lock 22. The lid 20 may be provided with means for assisting in opening the lid, as for example, assist springs, if desired.

It will be understood that the seal 14 extends around the open periphery of the upper end of the body 10. As shown in FIG. 6, the seal 14 is operatively carried on a suitable metal carrier strip 86 which is mounted to vertical support stiffeners 92 on the body 10 by any suitable means, as by riveting. One of the pair of hinges 16 is located in each of the forward corners of the body 10, and each of the hinges 16 comprises the following structure. As shown in FIG. 6, a curved mounting arm 87 has its upper end fixed to the lid 20 by any suitable means, as by bolting. The lower end of the arm 87 is pivotally mounted by a pivot pin 88 to the upper end of a carrier plate 89. The carrier plate 89 is slidably mounted in a U-shaped vertical adapter 90 that is secured to the vertical support stiffener 92. The hinge carrier plate 89 is provided with a recess 93 in the lower end thereof which is adapted to be seated on a cross pin 94 that is mounted between the sides of adapter 90. The carrier plate 89 is also secured to the adapter 90 by a pivotally mounted latch member 95 which is pivotally mounted by a pivot pin 96 to the carrier plate 89. The latch member 95 has a hook-shaped end 97 that is adapted to be swung inward in a counterclockwise direction, as viewed in FIG. 6, and be mounted around a second cross pin 98 that is fixed between the sides of adapter 90. It will be seen that by swinging both latch members 95 outward, so as to release the latch members 95 from the pins 98, the hinge carrier plates 89 may be lifted upwardly to detach the lid 20 from the body 10. The numeral 20a in FIG. 6 illustrates the open position of the lid 20 when it is swung upwardly to permit access to the body 10.

It will be seen that the utility trailer 8 of the present invention is a lightweight and compact trailer that is closely connected to a towing vehicle by the two ball socket type attachments 37 which insure united trailer and vehicle rear end lateral motions. The united rear end lateral motion with the towing vehicle is also insured because of the use of the two laterally spaced apart, and independent swivelly mounted load support wheels 71, which are attached to the frame of the trailer 8 by means of the two quarter-elliptic type springs and by two articulated trailing arms.

Figure 5:
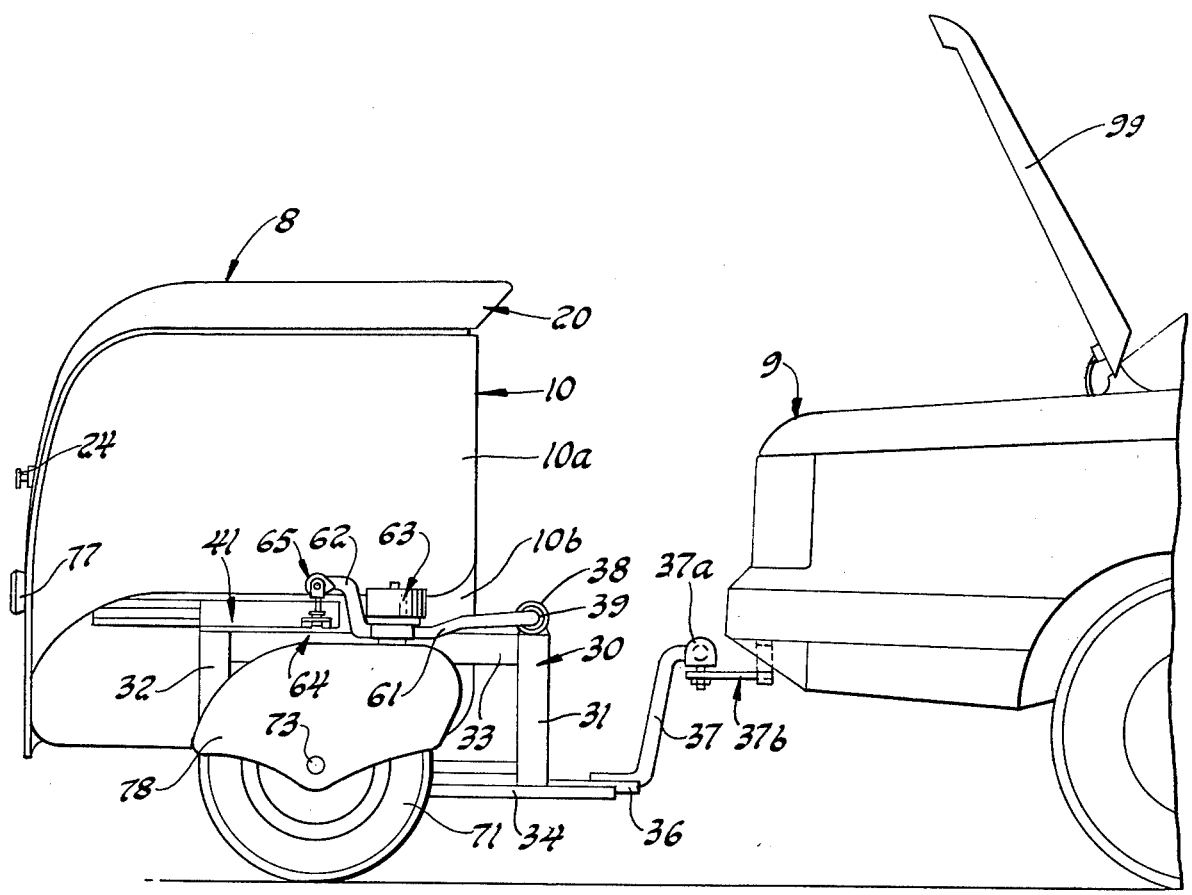
FIG. 5 is a side elevation view, similar to FIG. 1, of the utility trailer of the present invention, and showing the trailer body moved rearwardly from the towing vehicle, and showing the vehicle luggage compartment door open.

The utility trailer 8 of the present invention is weather tight, and it provides a conveniently lockable enclosure which is provided with a low liftover cut-out in the rear loading area of the body 10 so that the lifting distance to take items out of the body 10 is short. The U-shaped frame provides a low center to provide for a low trailer body which is easy to see over. The body 10 is attached to the U-shaped frame by sliding means, so that the body 10 may be relocated in a rearward position, as shown in FIG. 5, to permit quick and easy access into the trunk of a towing vehicle 9 when the trunk lid 99 of a towing vehicle 9 is opened for entry into the trunk of the towing vehicle. As shown in FIG. 1, during a towing operation, the utility trailer 8 would have the body 10 moved to the forward position.

While it will be apparent that the preferred embodiment of the invention herein disclosed is well calculated to fulfill the objects above stated, it will be appreciated that the invention is susceptible to modification, variation and change.

What is claimed is:

1. In a utility trailer that is closely connected to a towing vehicle, the combination comprising:
   (a) a frame;
   (b) a body operatively mounted on said frame;
   (c) a wheel disposed on each side of said frame;
   (d) a vertical support means on each side of said frame for rollably carrying the wheel at each side of said frame and for rotation about a vertical axis;
   (e) suspension means on each side of said frame for operatively attaching each of said vertical support means to said frame;
   (f) a pair of laterally spaced apart trailer attachment means carried on said frame for releasably attaching the trailer to a towing vehicle to insure united trailer and vehicle rear lateral motion;
   (g) means for slidably mounting said enclosed body on said frame for manual movement between a forward traveling position and a retracted position to allow easy access to the trunk of a towing vehicle;
   (h) said body comprising a weathertight enclosure having a hingedly and releasably mounted lid;
   (i) said body enclosure is provided with a low center, and a low liftover cutout in the rear end thereof for easy loading of the body enclosure;
   said frame is a U-shaped frame with a pair of vertical sides and a horizontal low center to provide for the reception of the low center of the body enclosure;
   (k) said means for slidably mounting said body on said U-shaped frame includes a first slide means operatively mounted between the outer side of the bottom wall of the low center of the body enclosure and the inner side of the low center of the U-shaped frame, a second slide means operatively mounted between the inner side of one of the vertical sides of the U-shaped frame and one side of the low center of the body enclosure, and a third slide means operatively mounted between the inner side of the other of the vertical sides of the U-shaped frame and the other side of the low center of the body enclosure; and,
   (l) latch means for releasably retaining the body enclosure in the forward traveling position.

2. A utility trailer as defined in claim 1, wherein each of said suspension means includes:
   (a) a spring means operatively connected between said frame and the rear end of a vertical support means; and,
   (b) an articulated trailing arm connected to said frame and to the front end of the last mentioned vertical support means.

3. A utility trailer as defined in claim 2, wherein:
   (a) each of said spring means comprises a quarter-elliptic type spring.

4. A utility trailer as defined in claim 1, wherein:
   (a) said pair of laterally spaced apart trailer attachment means comprises a pair of ball-socket type attachments.

5. A utility trailer as defined in claim 1, wherein:
   (a) said lid is provided with means for locking the same in a closed position.

* * * * *